Jan. 20, 1970  E. R. ATKINSON  3,490,723
RAILWAY TRAILER HITCH WITH RIGIDIZING MECHANISM
Filed Sept. 16, 1968  3 Sheets-Sheet 1

INVENTOR.
EULAS R. ATKINSON
BY
*James Jackson*
ATTORNEY

INVENTOR.
EULAS R. ATKINSON
BY *James E. Jackson*
ATTORNEY

Jan. 20, 1970   E. R. ATKINSON   3,490,723
RAILWAY TRAILER HITCH WITH RIGIDIZING MECHANISM
Filed Sept. 16, 1968   3 Sheets-Sheet 3
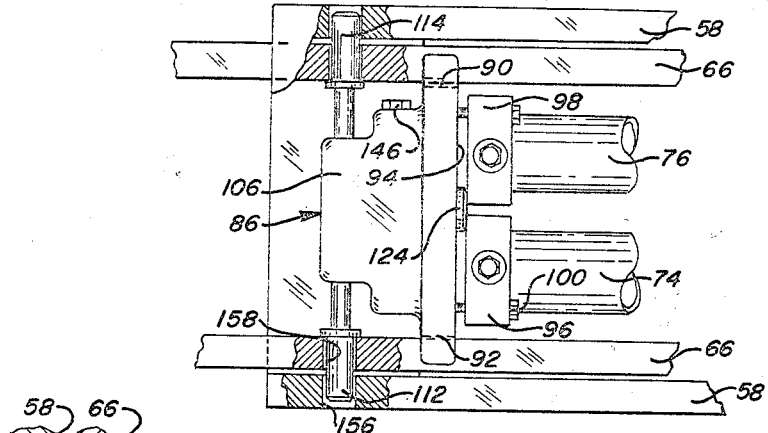
FIG. 6
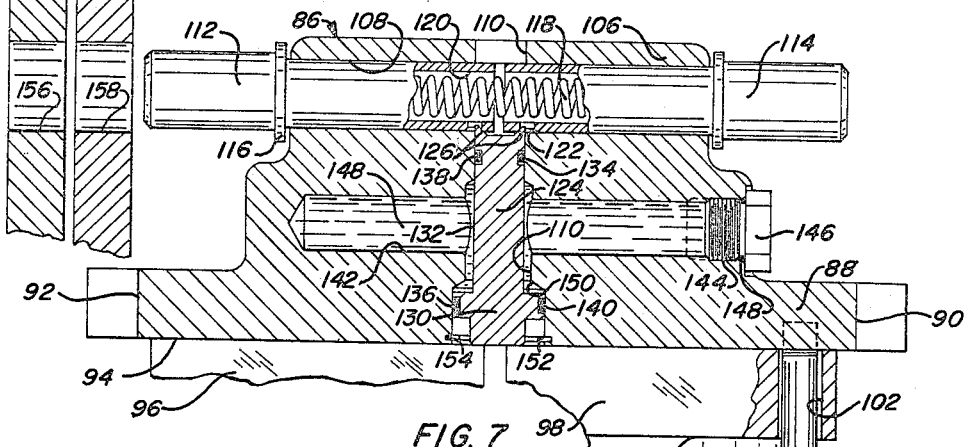
FIG. 7
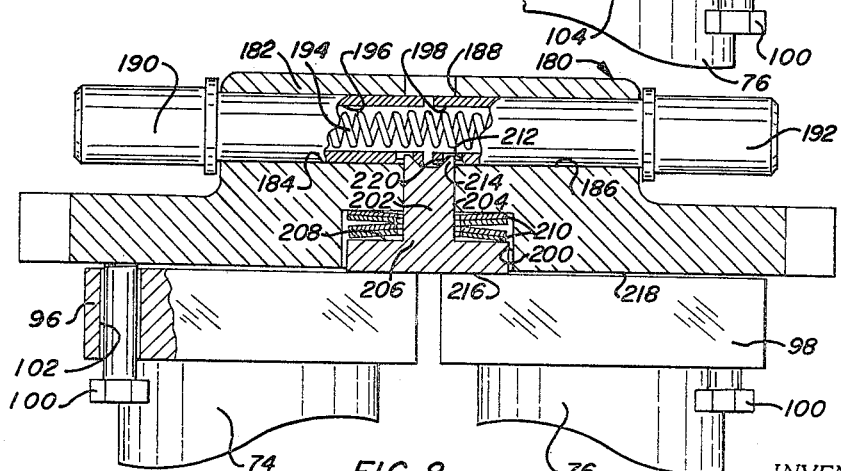
FIG. 8
INVENTOR.
EULAS R. ATKINSON
BY
ATTORNEY United States Patent Office 3,490,723
Patented Jan. 20, 1970

3,490,723
RAILWAY TRAILER HITCH WITH
RIGIDIZING MECHANISM
Eulas R. Atkinson, Conroe, Tex., assignor to ACF Industries, Incorporated, New York, N.Y., a corporation of New Jersey
Filed Sept. 16, 1968, Ser. No. 759,973
Int. Cl. B60p 7/16, 7/06
U.S. Cl. 248—119                        13 Claims

ABSTRACT OF THE DISCLOSURE

A trailer hitch structure for securing vehicle trailers and the like to the deck of a railway flat car. The hitch structure includes an upright strut which is capable of being moved between upright and collapsed positions for loading and unloading purposes and is movable in the upright or operative position thereof between a neutral position and forward and rearward positions against the bias of a cushioning mechanism for the purpose of cushioning impact forces which might otherwise be transmitted to the vehicle trailer. The hitch structure includes the mechanism for automatically rigidizing the hitch structure responsive to predetermined conditions of the cushioning mechanism.

BACKGROUND OF THE INVENTION

This invention is particularly concerned with trailer hitch structures for railway cars which are employed to secure a vehicle trailer or the like to a railway flat car for transporting the vehicle trailer by rail. Such trailer hitches originally were of a rigid nature and were fixedly secured to the deck of a railway flat car by welding or the like. Rigid trailer hitch structures were deemed generally undesirable because of difficulty encountered in loading vehicle trailers onto the railway car and because such rigid structures transmit impact forces to which the railway is subjected directly to the trailer, thereby possibly resulting in damage to the trailer cargo. Eventually railway trailer hitches were developed which were collapsible to allow easy loading of vehicle trailers onto railway cars, but these hitches were rigid in their operative position and provided no protection whatever against the transmission of impact forces to vehicle trailers. Trailer hitches have been recently developed which incorporate cushioning mechanisms to cushion the impact forces which are applied through the trailer hitch structure to the vehicle trailer. Cushioned railway trailer hitch structures are quite advantageous and provide effective protection for the cargo carried by railway vehicle trailers, but they are subject to a severe disadvantage in the event such structure subsequently becomes worn or damaged to the extent that cushioning ability of the hitch structure is severely reduced or rendered inoperative. A defective cushioning unit structure may allow the trailer hitch to freely oscillate between its maximum limits, thereby allowing the vehicle trailer to move freely on the railway car. When this occurs, shock forces applied to the vehicle trailer will be multiplied and the cargo of the trailer may be subjected to severe damage.

It is therefore a primary object of this invention to provide a novel railway trailer hitch structure for securing a vehicle trailer to the bed of a railway flat car which is capable of cushioning impact forces which are applied through the trailer hitch structure to the vehicle trailer and which will automatically effect rigidization of the trailer hitch structure in the neutral position thereof in the event the cushioning capability of the hitch should decrease to a predetermined low level.

It is a further object of this invention to provide a novel railway trailer hitch structure including a cushioning mechanism for cushioning impact forces applied through the trailer hitch structure to the vehicle trailer and which is capable of collapsing to facilitate loading of the vehicle trailer on the railway car.

Among the several objects of this invention is the provision of a novel railway trailer hitch structure which is simple in nature, reliable in use and low in cost.

The foregoing along with additional objects and advantages will become apparent from the following description of a specific embodiment of the invention, the description being taken in conjunction with the accompanying drawings in which:

FIGURE 6 is a sectional view of the strut immobilizing mechanism of the trailer hitch structure illustrating the position of the internal parts thereof subsequent to actuation thereof.

FIGURE 7 is a sectional view of the strut immobilizing mechanism of the trailer hitch structure of this invention illustrating the position of the internal parts thereof prior to strut immobilizing actuation. FIGURE 7 is oriented 90° clockwise with regard to FIGURE 6.

FIGURE 8 is a sectional view of a modified embodiment of the safety lock mechanism illustrating the position of the internal parts thereof in detail. Figure 8 is also oriented 90° clockwise relative to FIGURE 6.

Figure 1:
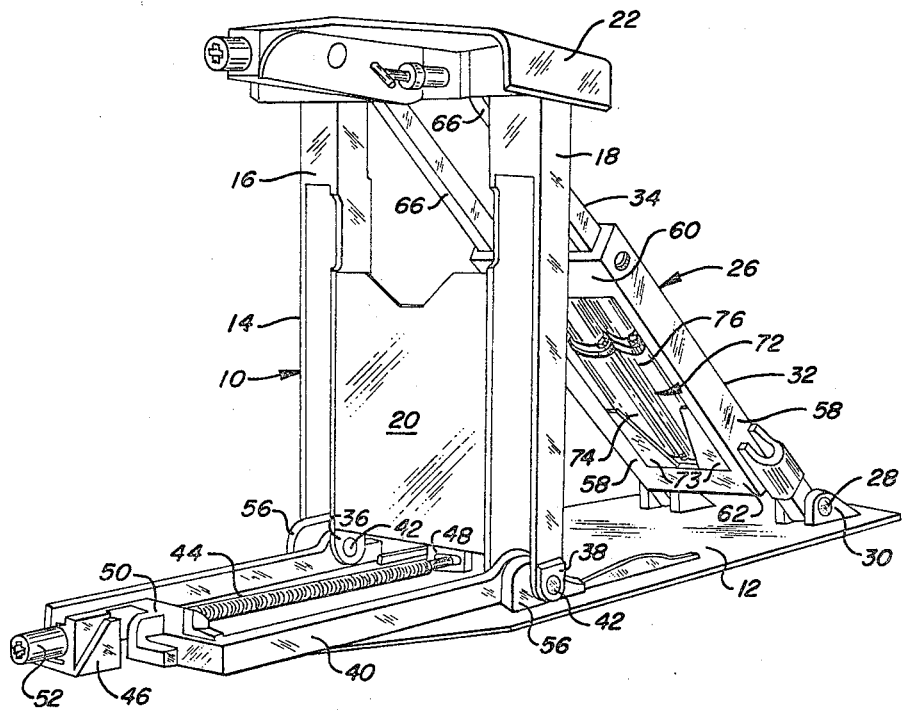
FIGURE 1 is a perspective view of a collapsible railway trailer hitch structure which is constructed in accordance with the spirit and scope of this invention.

With reference now to the drawings for a more detailed description of our invention, FIGURE 1 illustrates a preferred embodiment of our invention which comprises a trailer hitch or support device 10 for the fifth-wheel of a semi-trailer to be transported by a railway flat car. The trailer hitch structure 10 is preferably mounted on a base plate 12 which is welded or otherwise fixed to the deck of a railway flat car, not shown. The trailer hitch structural elements, however, may be directly connected to the deck of the railway flat car, if desired, without departing from the spirit or scope of this invention. The trailer hitch structure includes a vertical strut 14 including a pair of parallel legs 16 and 18 which are interconnected by means of a brace plate 20 or other similar bracing structure. A fifth-wheel support structure 22 is connected by means of a pivot to the upper extremity of the legs 16 and 18 and is adapted to pivot from a position substantially normal to the vertical strut 14 in the upright position of the hitch as shown in FIGURE 1 to a position substantially parallel to the vertical strut 14 in the collapsed position of the hitch 10. This pivotal movement allows the fifth-wheel support to be disposed in substantially parallel relation with the base plate 12 in both the upright and collapsed positions of the hitch.

The fifth-wheel support 22 may be constructed in accordance with any one of a number of commercially acceptable types which releasably secure the fifth-wheel of a semi-trailer to the trailer hitch structure.

The trailer hitch is provided with a diagonal brace or diagonal leg shown generally at 26 which is pivotally connected to the upper extremity of the vertical strut 14 and has its lower extremity connected by means of a pivot 28 to a lug 30 which is welded or otherwise fixed to the base plate 12. The diagonal leg 26 is constructed in the form of a telescoping frame including an outer frame 32 which receives an inner frame 34 in telescoping relation therein. The specific construction of the diagonal leg 26 and its operative relationship with the structural elements of the trailer hitch 10 will be set forth in detail hereinbelow.

Each of the vertical parallel legs 16 and 18 of the vertical strut 14 is bifurcated at its lower extremity defining inner and outer clevis plates 36 and 38 respectively. A horizontal operating frame 40 is connected by means of pivots 42 to the inner clevis plates 36 thereby establishing pivotal connection between the horizontal frame and the vertical strut 14. An operating screw 44 for raising and lowering the trailer hitch 10 between its operative and stored or collapsed positions is retained in parallel relation with the base plate 12 by bearing structures 46 and 48. The operating screw 44 is provided with drive threads and is threadingly received within an internally threaded frame drive assembly 50 carried by the operating frame 40. The operating screw 44 is provided at its outer extremity with drive connection structure 52 for connecting the operating screw to manual or mechanical means for imparting rotation to the operating screw.

In the operative position of the trailer hitch 10 as illustrated in FIGURE 1, the pivot pins 42 are maintained in engagement with abutment lugs 56, which are fixed to the base plate 12 by welding or the like. In the operative position of the trailer hitch as shown in FIGURE 1, the pivot pins 42 will form a substantially fixed pivot for the lower extremities of the vertical supports. To lower the trailer hitch to its stored or collapsed position, the operating screw 44 is rotated in a direction driving the operating frame 40 rearwardly toward the lugs 30. The operating frame by virtue of its connection with the vertical support will force the lower portion of the vertical strut 14 rearwardly thereby causing the vertical support to be lowered to a position where it lies flat on the base plate 12 or on the deck of the railway car. At the same time, the fifth-wheel support will pivot to a position where it is substantially parallel with the vertical strut 14 and will be lowered with the vertical strut until it rests flat on or adjacent to the deck of the railway car. The collapsed height of the trailer hitch is such that riser boards are not required to maintain proper clearance between the collapsed hitch and the axle of a trailer being loaded onto the car. This feature promotes the competitive nature of railway cars by achieving low cost construction.

Figure 2:
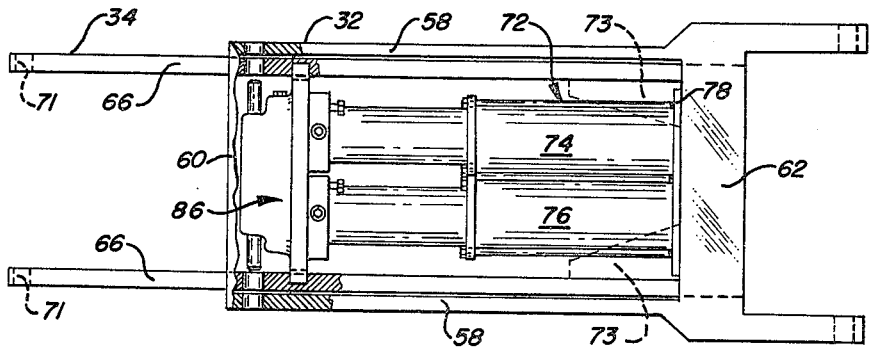
FIGURE 2 is a plan view of the diagonal leg assembly of the railway trailer hitch structure of FIGURE 1 illustrating the diagonal leg in its neutral position and having a portion thereof broken away and illustrating the strut immobilizing feature of the trailer hitch.
Figure 4:
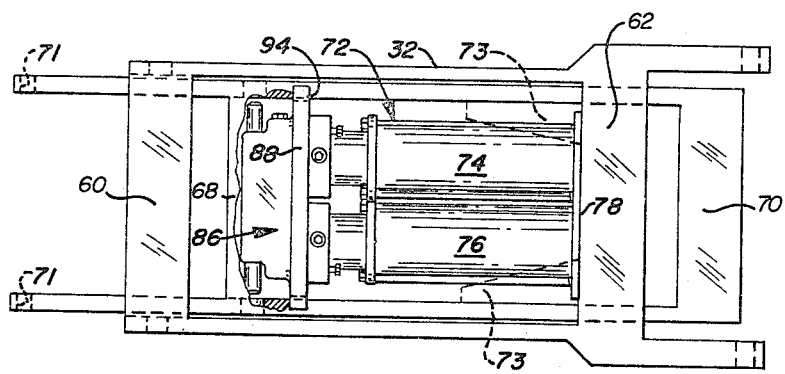
FIGURE 4 is a plan view of the diagonal leg structure of FIGURE 1 illustrating the relationship of the strut immobilizing mechanism to the diagonal leg structure in the compressed position thereof.
Figure 3:
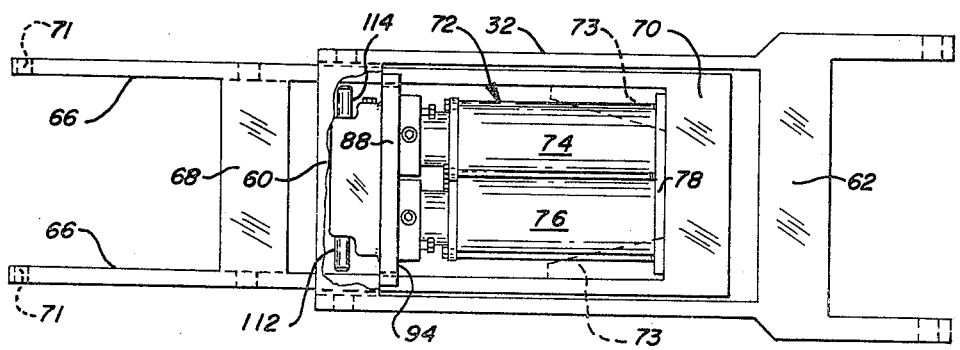
FIGURE 3 is a plan view of a diagonal leg structure of FIGURE 1 in the extended position thereof illustrating the relationship of the strut immobilizing mechanism in this position.

With reference now to FIGURES 2, 3, and 4, the diagonal leg 26 comprises a pair of parallel outer rails 58 having transverse brace plates 60 and 62 fixed therebetween to maintain the rails 58 in substantially parallel relationship and defining a generally rectangular parallelogram. The inner frame 34 comprises a pair of substantially parallel rails 66 having pairs of transverse brace plates 68 and 70 fixed therebetween by welding or the like. The inner frame is received in telescoping relationship within the outer frame 32. The lower extremity of the outer frame 32 is connected to the pivot lug 30 by the pivot pin 28. The upper pivot pin connecting the fifth-wheel support to the vertical support is also received within pivot apertures 71 formed at the extremity of the inner frame 34 thereby pivotally connecting the upper portion of the diagonal leg to the fifth-wheel support assembly 22 and the vertical support 14. The parallelogram structure defit to define a generally rectangular opening in which is disposed a cushioning unit assembly illustrated generally at 72.

The cushioning unit assembly 72 comprises a pair of gas-hydraulic cushioning units shown generally at 74 and 76 which are disposed in generally parallel relationship. The cushioning unit assembly 72 is provided at its lower extremity with a guide plate 78 which is received between the inner rails 66 and which retains the lower portion of the cushioning unit in assembly within the diagonal leg structure. The normally disposed transverse plates 70 also form an abutment for the guide plate 78. Upper and lower pairs of fillet members 73 are fixed to the outer frame 32 by welding or the like and serve to prevent lateral misalignment of the cushioning units relative to the diagonal leg structure.

With reference now to FIGURES 2, 3, and 4, it will become apparent that the cushioning unit assembly 72 is compressed to dissipate energy regardless of the direction of impact which is transmitted to the diagonal leg of the hitch. In the centered or neutral position of the diagonal leg as shown in FIGURE 2, the guide plate 78 is disposed in engagement with the transverse plates 62 and the transverse plates 70 on the outer frame and inner frame, respectively. In the centered position of the diagonal leg, the upper guide portion 88 of a strut immobilizing mechanism 86, to be discussed in detail hereinbelow, is maintained in abutment with the transverse plates 68 of the inner frame 34 and the transverse plates 60 of the outer frame 32. In the event impact forces on the trailer and fifth-wheel structure force the vertical support 14 to be rotated rearwardly about the pivot 42, the inner frame 34 will be telescoped inwardly relative to the outer frame 32 as illustrated in FIGURE 4. When this occurs the transverse support plates 68, being rigid with the inner frame 34, will force the upper portion of the cushioning unit assembly 72 in a rearward direction. Under this condition, the lower transverse support plates 70 of the inner frame will move out of contact with the lower guide plate 78 and the guide plate 78 will be maintained in abutment with the transverse plate 62 of the outer frame 32 thereby causing the cushioning unit assembly 72 to become compressed thereby resulting in energy dissipation.

In the event impact forces on the trailer cause the vertical support to rotate forwardly about its pivot, the inner frame will become telescoped outwardly with regard to the outer frame as illustrated in FIGURE 3. When this occurs, the transverse plate 68 will move out of abutment with the upper guide portion 88 of the strut immobilizing mechanism and the transverse plate 60 of the outer frame 32 will prevent upward movement of the uppermost portion of the cushioning unit assembly. The lower transverse plates 70 of the inner frame however will move the lower guide plate 78 out of abutment with the transverse plates 62 thereby causing compression of the cushioning unit assembly which results in dissipation of energy. It is therefore clearly apparent that impact loads from either direction causing either forward or rearward pivoting of the vertical strut 14 will result in compression of the cushioning unit assembly and dissipation of energy.

A strut immobilizing mechanism illustrated generally at 86 is positioned between the transverse brace plates 62 and 68 has a guide portion 88 thereof defining opposed recesses 90 and 92 which receive the inner rails 66 of the inner frame 34. The guide portion 88 of the strut immobilizing mechanism 86 defines a substantially planar surface 94 which, in the operative condition of said cushioning units, is disposed in abutment with the end caps 96 and 98 of the cushioning units 74 and 76 respectively. Bolts 100 extend through apertures 102 in each of the end caps 96 and 98, and secure the safety lock mechanism to the cushioning units. It should be noted that when the hydraulic cushioning units 74 and 76 are disposed in abutment with the surface 94 the head of the bolt 100 is spaced from a stop surface 104 defined by the end cap 98. This is to allow the strut immobilizing mechanism 86 to move away from the hydraulic cushioning units an amount defined by the space between the head of the bolt 100 and the surface 104 as shown in FIGURE 6. This feature, along with the functional necessity therefor will be discussed morefully hereinbelow.

Figure 5:
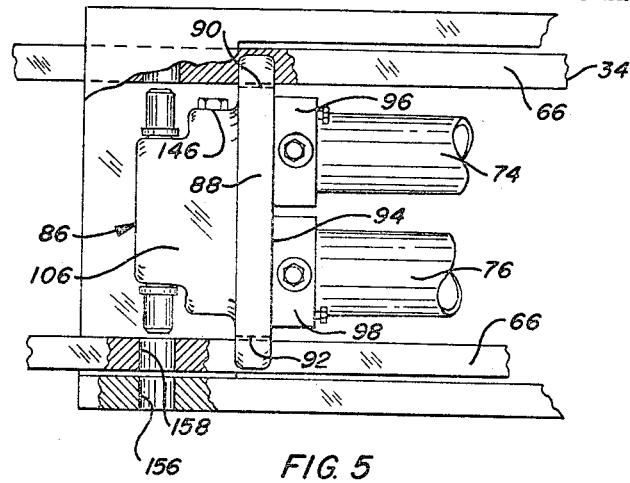
FIGURE 5 is a fragmentary plan view of the diagonal leg structure of FIGURE 1 having a portion thereof broken away and showing the strut immobilizing structure of the hitch in section.

The strut immobilizing mechanism 86 comprises a housing 106 which is preferably formed integrally with the guide portion 88 and which is provided with a locking pin bore 108 disposed in substantially normal relationship to the axes of the hydraulic cushioning units. The locking pin bore 108 is intersected by a locking pin release bore 110 which is disposed substantially parallel to the axes of the cushioning units. A pair of locking pins 112 and 114 extend into the locking pin bore 108 from each extremity thereof and are provided with an annular flange 116 which limits the extent to which the locking pins penetrates the bore 108. A compression spring 118 is retained within blind bores 120 formed in each of the locking pins 112 and serves to bias the locking pins in an outwardly direction. In order to retain the locking pins 112 and 114 in the latched position as illustrated in FIGURES 5 and 7, apertures 122 are formed in the locking pins adjacent the inner extremity thereof. A latch member 124 is received within the bore 110 and is provided with latching ears 126 which, in the latched position of the locking pins 112 and 114, are received within the apertures 122. The latching ears are provided with tapered cam surfaces which in the latch position are disposed in intimate engagement with the locking pin members 112 and 114. The locking pins bearing upon the tapered cam surfaces produce a downward resultant force on the latch member 126 which urges the latch member toward the cushioning units. This force aids in movement of the latch member 126 toward its releasing position.

The latch member 126 includes a piston like head 130 which is preferably formed integrally with a cylindrical portion 132. The cylindrical portion 132 is of smaller diameter than the piston head 130 for the purpose of developing a force differential on the latch member as described in detail hereinbelow. The cylindrical portion and piston head portion of the latch 124 are received within portions of the bore 110 which are of corresponding size for close fitting relationship. The cylindrical portion 132 and the piston head 130 are formed with annular grooves 134 and 136 respectively which receive annular sealing members 138 and 140 to establish fluidtight seals between the latch member and the bore 110.

A transverse passage 142 is formed in the housing 106 and is provided with threads 144 at the outer extremity thereof which receive a threaded closure plug 146. An annular sealing member 148 is interposed between the closure plug 146 and the wall of the transverse passage 142 to establish a fluidtight seal and prevent leakage of fluid from the passage 142. The transverse passage 142 and the release bore 110 between the seals 138 and 140 cooperate to define a storage chamber 148 for a compressible liquid such as silicone. The piston head 130 is of substantially larger diameter than the diameter of the cylindrical portion 132 thereby presenting a greater surface area against which the compressible fluid acts. The compressible fluid therefore produces a greater force on the piston head than on the cylindrical portion of the latch member thereby urging the latch member toward the cushioning units. Fluid pressure acting against the larger head 130 develops a force which overcomes the action of fluid under the same pressure acting against the smaller surface area of the cylindrical portion 132 of the latch 124. Movement of the latch member 124 in an upwardly position as illustrated in FIGURE 7 is limited by an annular shoulder 150 while movement of the latch member in the opposite or downward direction as illustrated in 7 is limited by a snap ring 152 received within an annular groove 154 formed in the housing 106.

The liquid chamber of the strut immobilizing mechanism 86 is ordinarily filled by adding compressible liquid with the piston 130 of the latch 124 in engagement with the snap ring 152. After filling the chamber 148, the closure plug 146 is threaded within the threaded outer portion of the transverse passage 142. The desired preload pressure is regulated by varying the amount of extension of the piston head 130 beyond the planar surface 94. The locking pin members 112 and 114 then will be moved to the FIGURE 7 position thereof and the cushioning units 74 and 76 will then be inflated causing the end caps 96 and 98 to bear upon the lower extremity of the latch member 124. As proper compression is achieved within the cushioning units 74 and 76, the latch member 124 is moved upwardly to the FIGURE 7 position thereof, thereby causing compression of the compressible fluid within the chamber 148 in addition to moving the locking ears 126 of the latch into engagement within the apertures 122 to secure the locking pins 112 and 114 in the FIGURE 7 position thereof. The cushioning units 74 and 76 acting together or either of the cushioning units acting alone will have sufficient centering force to return the trailer hitch structure to its neutral position subsequent to an impact force and therefore, as long as the cushioning units 74 or 76 either acting alone or in combination produce sufficient force to move the trailer hitch structure to its neutral position, the latch member 124 will be held or maintained in its FIGURE 7 position. In the event however that the preload pressure within the cushioning units should decrease to the point that there is insufficient force produced thereby to move the trailer hitch structure to its neutral position, the liquid under pressure within the chamber 148 acting against the piston 130 will move the latch member downwardly thereby forcing the end caps 96 and 98 of the cushioning units away from the substantially planar surface 94 until the surface 104 contacts the head of bolt 100. As this occurs, the ears 126 of the latch 124 will be retracted from the apertures 122, thereby releasing the locking pins 112 and 114 and allowing the spring 118 to bias the locking pins outwardly, extending them through apertures 156 and 158 in parallel rails 58 and 66 respectively. When this occurs the inner and outer frames of the diagonal leg structure will be locked in immovable relation thereby preventing either extension or contraction of the diagonal leg. The trailer hitch will be rendered substantially rigid and the upright strut 14 will not be allowed to oscillate about its pivot.

In the event the apertures 156 and 158 should be misaligned when the locking pins 112 and 114 are released by the latch 124 the pins 112 and 114 will merely extend through the aperture 158 in the inner rail 66 and will slidingly engage the inner surface of the outer rail 58. Upon subsequent relative movement of the outer rail 58 and the inner rail 66 the aperture 156 will become aligned with the aperture 158 and the locking pins 112 and 114 will extend into the apertures 156 thereby locking the outer rail and inner rail so that further relative movement therebetween is precluded. In this condition, the hitch structure will function only as a rigid hitch and will not have cushioning capability.

Servicing of the cushioning units 74 and 76 with the safety lock mechanism in the tripped or FIGURE 6 position thereof, will expand the cushioning units sufficiently to force the latch member 24 into engagement with the cylindrical portion of the locking pins 112 and 114. The locking pins then will be moved from their tripped position to the FIGURE 5 position thereof, thereby causing the ears 126 to engage the apertures 122 and latching the locking pins in the FIGURE 5 position thereof.

With the safety lock mechanism 86 in the FIGURE 5 position thereof, it is quite obvious that the diagonal leg of the cushioning unit may extend and contract as buff end draft forces are applied thereto. The hydraulic cushioning units 74 and 76 under these conditions will be sufficiently inflated to maintain the latch member 124 into positive engagement within the apertures 122 causing the locking pin members 112 and 114 to be retained in the FIGURE 5 position thereof.

With the safety lock mechanism 86 in its FIGURE 6 or locked position, it is quite obvious that the inner and outer rails of the diagonal leg structure will be locked together in immovable relation. The diagonal leg therefore will not yield from the application of buff or draft forces and will function substantially as a rigid hitch structure. The hitch will collapse to its horizontal or inoperative position upon rotation of the threaded operating stem 44 even through the diagonal leg structure may be locked. Since the strut immobilizing mechanism is substantially enclosed within the diagonal leg the locking pins will not be readily visible in the latched or FIGURE 7 position thereof but when the strut immobilizing mechanism is disposed in the tripped or FIGURE 6 position thereof the extremities of the locking pins will be clearly visible. A visual indication is therefore given to indicate the condition of the strut immobilizing mechanism. If desired, the ends of the locking pins may be brightly painted or may be coated with luminescent material so that visual inspection of the strut immobilizing mechanism will be more easily accomplished.

With reference now to FIGURE 8 of this application, a modified strut immobilizing mechanism, illustrated generally at 180, includes a housing 182 which is provided with locking pin bores 184 and 186 which intersect a locking pin latch bore 188. Locking pins 190 and 192 are received respectively in the locking pin bores 184 and 186 and are biased away from one another by a compression spring 194 received within blind bores 196 and 198 formed therein. It should be noted that the locking pin and compression spring structure is constructed substantially identical with respect to the locking pins 112 and 114 illustrated in FIGURES 2 through 7. The housing 182 is provided with a recess 200 formed concentrically with respect to the locking pin latch bore 188. A latching member 202 is received within the recess 200 with a cylindrical portion 204 thereof disposed within the operating stem latch bore 188. The latch 202 is provided with a pressure plate 206 formed integrally therewith which defines an annular shoulder 208. At least one and preferably a plurality of Belleville springs 210 are located within the recess 200 and bear against the annular shoulder 208. The Belleville springs 210 serve to bias the pressure plate 206 and the latch 202 in an outwardly direction toward the end caps 96 and 98 so that a predetermined pressure is exerted on the end caps of the hydraulic cushioning units 74 and 76.

The locking pins 190 and 192 are provided with apertures 212 which are positioned to receive ears 214 formed on the cylindrical portion of the latch 202 for the purpose of latching the locking pins 190 and 192 in the inoperative position or latched thereof. The hydraulic cushioning units 96 and 98 when fully inflated to proper operating pressure, will force the latch member inwardly until the contacting surface 216 of the latch is disposed essentially coplanar with the planar surface 218 of the housing 182. Under this condition the Belleville springs 210 will be fully compressed and the ears 214 of the latch 202 will be received within the latching apertures 212 of the locking pins.

In the event the hydraulic cushioning units become deflated to a degree that there is insufficient internal pressure for proper operation thereof, the Belleville springs 210 will overcome the cushioning units and will force the latch 202 to outwardly forcing the end caps 96 and 98 away from the planar surface 218 of the housing 182. The ears 214 of the latch 202 will be withdrawn from the apertures 212 thereby releasing the locking pins 190 and 192 thereby allowing the compression spring 194 to force the locking pins into locking engagement within the apertures 156 and 158 of the outer rail 58 and the inner rail 66 respectively. Actuation of the latch 202 by the Belleville springs 210 is assisted by the tapered cam surfaces 220 which cooperate with the apertures 212 to produce a linear resultant force downwardly on the latch 202 as illustrated in FIGURE 8. This feature insures positive movement of the latch 202 against the deflated cushioning units 96 and 98.

The strut immobilizing mechanism 180 is reset to its inoperative position by inflating the cushioning units 96 and 98 sufficiently to force the latch member 202 into engagement with the locking pin 190 and 192. As the locking pins are moved to their innermost position, the ears 214 of the latch 202 will be received within the apertures 212 thereby latching the pins 190 and 192 in their inoperative position.

Both of the modifications of my invention function in response to the fluid pressure within the hydraulic cushioning unit and serve to maintain the safety lock mechanism in an inoperative position when the preload pressure within the hydraulic cushioning unit is below a predetermined operative level. Upon becoming deflated below the predetermined operative level, the structure of both modifications will cause the locking pin structures to be released and to move into locking engagement within apertures in the inner and outer parallel rails of the diagonal leg thereby substantially rigidizing the same. Each of the embodiments of my invention function automatically in response to a predetermined decrease in fluid pressure within the cushioning units to achieve locking of the diagonal leg of the trailer hitch in a rigid and safe condition.

It is evident therefore, that I have provided a safety lock mechanism for the diagonal leg structure of a collapsible railway trailer hitch structure which is effective to allow cushioned oscillating movement of the trailer hitch structure as long as a fluid pressure within the hydraulic cushioning units is maintained at a predetermined minimum safe level and which is effective upon a decrease of fluid pressure within the hydraulic cushioning units below the predetermined level to automatically lock the diagonal leg structure of the cushioning unit and to substantially rigidize the railway trailer hitch. My invention effectively prevents oscillation of the trailer hitch structure between maximum limits in the event the hydraulic cushioning units carried thereby become deflated to a dangerous or ineffective condition. This feature prevents excessive shock forces from being applied to the vehicle trailer supported by the trailer hitch in the event the hydraulic cushioning units should become deflated. The trailer hitch structure of my invention includes a safety lock mechanism which is simple in nature, reliable in use, and low in cost. The invention therefore, is one well adapted to obtain all of the objects hereandabove set forth together with other advantages which are obvious and inherent from a description of the apparatus itself.

I claim:

1. In a railway flat car, a hitch for vehicle trailers or the like, said hitch being mounted on said car and comprising a generally upright strut having kingpin securing means thereon adapted to secure the kingpin of a vehicle trailer or the like, cushioning means operatively connected to said strut urging said strut to a generally upright neutral position for cushioning impact forces exerted against the railway car and returning said strut to neutral position after a cushioning movement of the strut in a direction longitudinally of the car, said hitch having strut immobilizing means responsive to a predetermined degree of loss in cushioning capability of said cushioning means and operatively connected to said strut to selectively secure said strut against movement away from its generally upright neutral position.

2. In a railway flat car, a hitch for vehicle trailers as set forth in claim 1, a diagonal leg connected between said upright strut and said flat car and being capable of varying its length in accordance with the direction of movement of said upright strut away from its neutral position, said strut immobilizing means being capable of locking said diagonal leg to prevent varying of the length of said diagonal leg, whereby said hitch will be rendered substantially rigid.

3. In a railway flat car, a hitch for vehicle trailers and the like as set forth in claim 2, said cushioning means comprising at least one hydraulic cushioning unit operatively connected to said diagonal leg.

4. A hitch mounted on a railway car comprising, a generally upright strut having kingpin securing means thereon adapted to secure the kingpin of a trailer or the like, means mounting said kingpin securing means and strut for movement in a direction longitudinally of the car upon impact forces exerted against the railway car and transmitted to said hitch, cushioning means operatively connected to said strut urging said strut to a generally upright neutral position for cushioning impact forces upon said movement of the strut, and strut immobilizing means responsive to fluid pressure in said cushioning means and operatively connected to said strut to selectively secure said strut against movement, said strut immobilizing means being actuated upon a predetermined low magnitude cushioning capability being reached in said cushioning means to secure said strut against movement.

5. A hitch as set forth in claim 4, said cushioning means comprising at least one hydraulic cushioning unit means having an internal preload fluid pressure, said strut immobilizing means being actuated responsive to a predetermined low preload fluid pressure in said cushioning unit means to secure said strut against movement.

6. A hitch as set forth in claim 5, said hitch having a diagonal leg member connected between the strut and the flat car, said diagonal leg member being capable of varying its length responsive to movement of said strut, said strut immobilizing means upon being actuated locking said diagonal leg to prevent variance in the length thereof, thereby rendering said hitch substantially rigid.

7. In a railway flat car, a hitch mounted on said car comprising, a generally upright strut having kingpin securing means thereon adapted to secure the kingpin of a trailer or the like, pivot means mounting the strut for pivotal movement in a direction longitudinally of the car, means permitting movement of said strut about said pivot means between an operative generally upright neutral position and an inoperative collapsed position, preloaded biasing means operatively connected to said strut urging said strut about said pivot means to said neutral position for cushioning impact forces exerted against the railway car and returning said strut to its neutral position after a cushioning movement of the strut about said pivot means in a direction longitudinally of the car, and strut immobilizing means being actuated responsive to the force exerted by said biasing means operatively connected to said strut and adapted to selectively secure said strut against movement away from its neutral position, said force responsive means being actuated upon a predetermined low force being reached in said preloaded biasing means to secure said strut against movement and to retain said strut in its neutral position thereby preventing movement of said strut upon a malfunctioning of said biasing means.

8. In a railway flat car, a hitch as set forth in claim 7, said means permitting movement of said strut about said pivot means comprising a diagonal leg member connected between said hitch and said car and being capable of varying its length in response to pivotal movement of said strut.

9. In a railway flat car, a hitch as set forth in claim 8, said strut immobilizing means being carried within said diagonal leg member and being operative upon being actuated to lock said diagonal leg member to prevent variance in the length thereof.

10. In a railway flat car, a hitch as set forth in claim 7, said means permitting movement of said strut about said pivot means comprising a diagonal leg member connected between said hitch and said car and being capable of varying its length in response to pivoting of said strut member, at least one hydraulic cushioning unit means operatively connected to said diagonal leg member and cushioning said diagonal leg during variance in the length thereof.

11. In a railway flat car, a hitch as set forth in claim 10, said strut immobilizing means being carried by said diagonal leg member and being operative responsive to actuation thereof to secure said diagonal leg against variance in length thereof, whereby pivotal movement of said upright strut will be effectively prevented.

12. In a railway flat car, a hitch for securing the kingpin of a vehicle trailer or the like to the flat car, said hitch comprising an upright strut member having kingpin securing means thereon, pivot means mounting the strut for pivotal movement in a direction longitudinally of the flat car, means permitting movement of said strut about said pivot means between an operative generally upright neutral position and an inoperative collapsed position, a diagonal leg connected between said upright strut and said flat car and including a pair of telescoping members allowing said diagonal leg to extend or contract as said strut is moved in either direction from its neutral position, preloaded biasing means operatively connected to said strut urging said strut about said pivot means to said neutral position for cushioning impact forces exerted against the railway car and returning said strut to its neutral position after a cushioning movement of the strut about said pivot means in a direction longitudinally of the car, strut immobilizing means having a housing, at least one pin member carried by said housing and being movable between an inoperative latched position and an operative position securing said telescoping members into a rigid assembly, means biasing said pin member toward said operative position, a latch member carried by said housing and normally securing said pin member in the inoperative position thereof, said latch member releasing said pin member responsive to a predetermined low biasing force being reached in said preloaded biasing means allowing said pin member to move to its operative position, whereby said hitch will be rendered substantially rigid.

13. In a railway flat car, a hitch as set forth in claim 12, said preloaded biasing means normally bearing against said housing and supporting said latch in the securing position thereof, said latch being biased toward the releasing position thereof, said preloaded biasing means being moved away from said housing by said latch upon reaching said predetermined low biasing force, whereby said locking pin will be released by said latch.

References Cited

UNITED STATES PATENTS

| | | |
|---|---|---|
| 3,142,466 | 7/1964 | Gutridge et al. |
| 3,216,590 | 11/1965 | Bateson 213—8 |
| 3,235,211 | 2/1966 | Robinson et al. |
| 3,246,866 | 4/1966 | Price et al. |
| 3,337,170 | 8/1967 | Remy et al. |

MARION PARSONS, JR., Primary Examiner

U.S. Cl. X.R.

105—368

PO-1050
(5/69)

UNITED STATES PATENT OFFICE
CERTIFICATE OF CORRECTION

Patent No. 3,490,723      Dated January 20, 1970

Inventor(s) Eulas R. Atkinson

It is certified that error appears in the above-identified patent and that said Letters Patent are hereby corrected as shown below:

Column 4, line 2, delete "fit" and insert -- fined by the outer frame 32 and the inner frame 34 interfit --; line 48, "when" should read -- When --; line 64, after "68" insert -- and --

Column 5, line 74, after "152" insert -- is --

Column 7, line 12, "through" should read -- though --; line 17, "or" should read -- of --

Signed and sealed this 15th day of June 1971.

(SEAL)
Attest:

EDWARD M. FLETCHER, JR.
Attesting Officer

WILLIAM E. SCHUYLER, JR.
Commissioner of Patents